Patented Dec. 23, 1930

1,785,955

UNITED STATES PATENT OFFICE

WILHELM HERZBERG, OF BERLIN-WILMERSDORF, AND HANS LANGE, OF DESSAU IN ANHALT, GERMANY, ASSIGNORS TO GENERAL ANILINE WORKS, INC., OF NEW YORK, N. Y., A CORPORATION OF DELAWARE

1-ω-AMINOMETHYL-NAPHTHALENE SULPHONIC ACIDS

No Drawing. Application filed December 17, 1929, Serial No. 414,815, and in Germany March 24, 1927.

The present invention relates to the new 1-ω-aminomethyl-naphthalenesulphonic acids which in the state of free acids correspond to the general formula

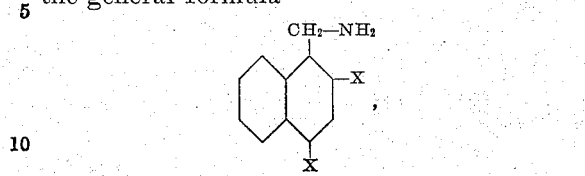

at least one X standing for $SO_3H$.

These acids are colorless compounds, which yield the corresponding naphthaldehyde sulphonic acids, for instance by transforming the benzyl-compounds in a known manner into the benzal-compounds and treating the benzal-compounds with a mineral acid.

The 1-ω-aminomethyl-naphthalenesulphonic acids are obtainable by treating 1-ω-aminomethyl-naphthalene (see application for Patent Ser. No. 96,870 filed March 23, 1926) with a sulphonating agent. By treatment with such sulphonating agents as strong sulfuric acid or fuming sulfuric acid, 1-ω-aminomethylnaphthalene yields 1-ω-aminomethylnaphthalene-2.4-disulphonic acid. There is first formed a mixture of the 2-sulphonic acid, which is insoluble in water, and the 4-sulphonic acid, which is easily soluble in water; these acids are easily separated from each other; on further sulphonation, whether individually or mixed together, they yield the 2.4-disulphonic acid:

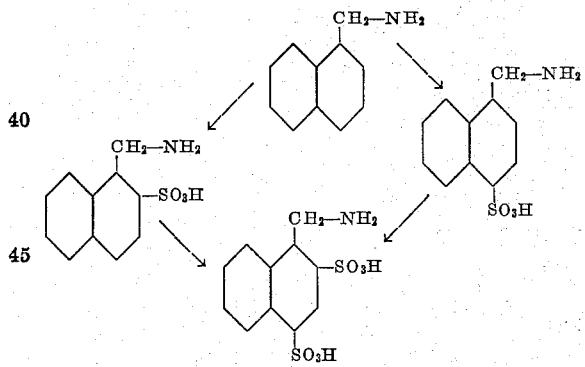

The following examples illustrate the invention without limiting it, the parts being by weight:

Example 1.—Into 5 parts of anhydrous sulfuric acid there are dropped 2 parts of 1-ω-aminomethylnaphthalene, the temperature not being allowed to rise above 50° C. When a sample no longer shows a separation of the base on addition of alkali, the whole is poured upon ice and the aqueous solution is gently heated on the water-bath. There separates the inner salt of 1-ω-aminonaphthalene-2-sulphonic acid

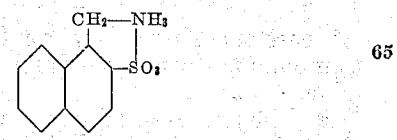

in the form of a white crystalline mass, sparingly soluble in water and sodium carbonate, but freely soluble in caustic soda solution. From the filtrate, by addition of lime, decomposition of the calcium salt with sodium carbonate, filtration and evaporation of the filtrate, there is obtained the sodium salt of the 4-sulphonic acid, which is freely soluble in water. These acids are obtained in substantially equal quantities.

Example 2.—2 parts of 1-ω-aminomethylnaphthalene are dropped into 5 parts of anhydrous sulfuric acid at 50° C. while stirring. Without separating the mixture of the monosulphonic acids thus formed, the sulphonation is carried further by adding 5 parts of fuming sulfuric acid containing 60 per cent of $SO_3$, at 70° C. After three hours the whole is poured upon ice, lime is added, the solution of the calcium salt is decomposed by means of sodium carbonate and the filtrate is evaporated. There is obtained in substantially theoretical yield the monosodium salt of the 1-ω-aminomethylnaphthalene-2.4-disulphonic acid, which is freely soluble in water and may be crystallized from a highly concentrated solution.

Example 3.—3 parts of 1-ω-aminomethylnaphthalene-2-sulphonic acid are introduced into 5 parts of anhydrous sulfuric acid and there are then run in 25 parts of fuming sulfuric acid containing 60 per cent of $SO_3$. At 60-70° C. the whole becomes dissolved and further sulphonation occurs. When a sample diluted with water and gently heated shows no separation of mono-sulphonic acid, the whole is poured upon ice and the 1-ω-aminomethylnaphthalene-2.4-disulphonic acid is worked up as described in Example 2.

*Example 4.*—13 parts of sodium-1-ω-aminomethylnaphthalene-4-sulphonate are introduced into 50 parts of anhydrous sulfuric acid and 50 parts of fuming sulfuric acid containing 60 per cent of $SO_3$ are run in. At 60-70° C. the 2.4-disulphonic acid is formed, it is isolated in the form of the mono-sodium salt as described in Example 2.

The term "sulphonic acids" in the specification and the claims is to include the free acids as well as their inner salts.

What we claim is:—

1. The new 1-ω-aminomethyl-naphthalene-sulphonic acids which in the state of free acids correspond to the general formula

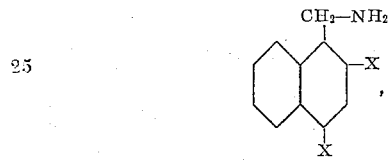

at least one X standing for $SO_3H$, colorless compounds, forming sodium salts easily soluble in water.

2. The new 1-ω-aminomethyl-naphthalene-2-sulphonic acid which in the state of the inner salt corresponds to the formula

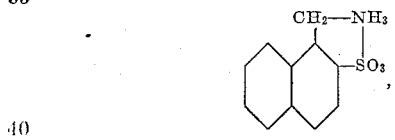

forming colorless crystals sparingly soluble in water, the sodium salt being easily soluble in water.

In testimony whereof, we affix our signatures.

WILHELM HERZBERG.
HANS LANGE.